INVENTORS:
F. G. HELFFERICH
R. A. LOTH
BY:

THEIR ATTORNEY

INVENTORS:
F. G. HELFFERICH
R. A. LOTH
BY: *Marion H. Western*

THEIR ATTORNEY

United States Patent Office 3,451,924
Patented June 24, 1969

3,451,924
N-PARAFFIN SEPARATION PROCESS
Friedrich G. Helfferich, Berkeley, and Rene A. Loth, Walnut Creek, Calif., assignors to Shell Oil Company, New York, N.Y., a corporation of Delaware
Filed Dec. 28, 1967, Ser. No. 694,324
Int. Cl. C10g 25/04
U.S. Cl. 208—310      7 Claims

ABSTRACT OF THE DISCLOSURE

A continuous cyclic vapor-phase process for the separation of n-paraffins from a hydrocarbon mixture by means of operating at least three molecular sieve beds in such a manner that each of the beds in turn is completely saturated with n-paraffins, purged of non-adsorbed feed stock and desorbed of n-paraffins.

---

This invention relates to a continuous process for the separation of n-paraffins from a hydrocarbon feed stock containing the same. More particularly this invention relates to a process for the cyclic, multibed vapor-phase separation of n-paraffins from a hydrocarbon feed stock utilizing a molecular sieve adsorbent comprising at least three sieve beds, whereby each bed in turn is saturated with adsorbed n-paraffins, purged of non-adsorbed feed and desorbed of n-paraffins by an n-paraffin eluent differing from the feed paraffins by at least two carbon atoms.

Various processes are known in the prior art for separating n-paraffins from other hydrocarbons by means of molecular sieves as adsorbents. These processes present a multiple of variables each designed to carry out a particular objective.

Exemplary of such processes are U.S. Patents 2,987,- 421, 3,160,581, 3,184,406, 3,277,647 and 3,309,415. These processes teach both liquid phase and vapor-phase adsorption and utilize various purge and desorption techniques and media. Some of the prior art processes are carried out in the vapor phase utilizing, as an eluent or desorbent, an n-paraffin having a different carbon number from the n-paraffins adsorbed from the hydrocarbon feed. These processes are generally carried out in the vapor phase and the elution or desorption step may be carried out either in a direction cocurrent to the flow of the feed entering the sieve bed or in the opposite direction. For example, U.S. Patents 2,987,471 and 3,184,406 are both drawn to a cocurrent desorption process whereas Patents 3,160,- 581, 3,227,647 and 3,309,415 all teach a desorption process carried out in the direction counter to that in which the feed entered the sieve bed.

While the prior art processes recognize the practicality of this type of operation, all have one basic deficiency, i.e. none of these processes utilize the molecular sieve beds to full capacity. The adsorption of n-paraffins from hydrocarbon mixtures in a molecular sieve bed is not a uniform operation, in other words, the feed is not adsorbed uniformly throughout the bed as the feed passes from the inlet to the outlet. This may be due to several causes, such as channeling within the molecular sieve bed or greater bulk density or packing density at one portion of the sieve bed than at another thereby retarding the flow of gases through that portion of the sieve. Perhaps the greatest reason for non-uniform adsorption has to do with the rate of diffusion of the adsorbed paraffins through the bed. The adsorption front of the n-paraffins being adsorbed or, if desorption is also taking place, the exchange front between the paraffin being adsorbed and eluent being desorbed is not sharply defined. In other words, there is not one point in the bed wherein all of the sieve contains adsorbate and a point immediately adjacent thereto where- in the sieve contains nothing but adsorbed eluent. Rather the exchange front contains a mixture of adsorbate being adsorbed and eluent being desorbed and may extend over a considerable length of the sieve bed depending upon conditions. For whatever reason, it is generally observed that n-paraffins from the feed "break through" or exit from the outlet end of the sieve long before the full capacity of the sieve has been utilized. One method proposed for more completely utilizing the sieve in a molecular sieve bed is to use longer sieve beds, thereby lengthening the period between the time feed enters the sieve bed until "break through" of n-paraffins from the bed occurs. However, this process has obvious disadvantages, one being the considerable inventory of molecular sieves that would be required to fill such a bed, another would be the great amount of eluent required to desorb the adsorbate from the bed and still another would be that because of diffusion of adsorbate the adsorption or exchange front would be considerably longer in a longer bed.

Another disadvantage of the prior art processes arises in the desorption of the adsorbate from the sieve bed in that it requires practically as much eluent to desorb the adsorbate from a bed which has been incompletely loaded with adsorbate during the adsorption step as from a bed which has been completely utilized. Therefore, the eluent to adsorbate ratio is higher for an incompletely utilized bed than for one that is completely saturated with adsorbate.

Applicants have now discovered a process which eliminates these disadvantages in the prior art. In conventional processes the adsorption step is continued until just prior to "break through" of normal paraffins from the hydrocarbon feed. This point is often hard to determine, for as the cycle alternates time after time between adsorption and desorption, the bed gradually becomes less effective and smaller quantities of feed paraffins will be adsorbed per cycle. Various procedures for timing the cycle have been worked out to prevent the "break through" of n-paraffins into the denormalized hydrocarbon stream leaving the molecular sieve bed. However, these procedures merely illustrate the disadvantages of the prior art processes since the timing cycle may stop feed from entering the sieve bed considerably before "break through" occurs, thereby lessening the degree of adsorption in relation to the capacity of the bed. On the other hand, if some kind of timing cycle is not utilized and feed n-paraffins break through the sieve and are passed out of the bed as effluent with the denormalized hydrocarbon feed, the object of the separation is defeated. Applicants' process utilizes a method whereby break through never occurs, i.e., n-paraffins from the hydrocarbon feed to be separated never break through into the effluent containing denormalized hydrocarbons. Yet, at the same time, the molecular sieve bed is completely saturated with the n-paraffins from the feed.

In accordance with the present invention, the difficulties of the prior art are overcome by using a vapor-phase adsorption process utilizing at least three molecular sieve beds which for purposes of illustration shall hereinafter be designated as Beds A, B and C. In carrying out the process at least one bed is constantly adsorbing n-paraffins from a hydrocarbon mixture containing the same until it is completely saturated with n-paraffins. This bed is then purged of non-adsorbed hydrocarbons from the feed and desorbed with an n-paraffin eluent having at least two carbon atoms more or less than the adsorbed n-paraffins hereinafter referred to as adsorbate.

The process is carried out in at least three operations, each operation containing two steps. For ease of definition, each of these steps is hereinafter referred to as a cycle and therefore the process will be defined as containing at least six cycles.

The process of the invention is carried out substantially as follows:

Cycle One

A hydrocarbon mixture containing n-paraffins to be separated is passed into the top of a molecular sieve Bed A, which functions as a primary adsorption bed. The non-normal hydrocarbons in the feed pass downwardly through the bed and out the exit while n-paraffins are adsorbed on the bed and eluent is desorbed. The effluent from Bed A is passed into the top of sieve Bed B which functions as a secondary adsorption bed, whereby any residual normal paraffins in the effluent from Bed A which have not been adsorbed in primary adsorption Bed A are adsorbed by Bed B, and adsorption effluent from Bed B, comprising the denormalized hydrocarbons and eluent which has been desorbed by adsorbate paraffins, is withdrawn and subsequently separated. Eluent comprising the normal paraffins having a higher or lower carbon number than the feed paraffins is fed into the bottom of sieve Bed C which is saturated with adsorbate from a previous cycle. The eluent flows upwardly through the bed thereby desorbing the adsorbate from the bed. From the top of the bed is withdrawn the desorption effluent which comprises the adsorbate paraffins and the eluent paraffins which subsequently are separated, for example, by distillation or other conventional means.

The above operation is continued until the primary adsorption Bed A becomes substantially completely saturated with adsorbate, i.e., when the n-paraffin content in the effluent from Bed A equals that in the feed, and the desorption Bed C is substantially desorbed of adsorbate, whereupon the hydrocarbon flow process is switched to Cycle Two.

Cycle Two

This cycle comprises passing the hydrocarbon feed into the top of sieve Bed B which now functions as a sole adsorption bed, thereby adsorbing n-paraffins (the adsorbate) from the feed and desorbing the eluent which has been adsorbed on the sieve from the previous cycle. The product withdrawn from the bottom of this sieve bed contains denormalized hydrocarbon feed and eluent which are separated in the same way as the effluent from sieve Bed B in Cycle One.

A second step in this cycle comprises passing eluent into the bottom of sieve Bed A which is now completely saturated with adsorbate. The eluent first functions as a purge gas and passes upwardly through the bed, thereby purging through the top of Bed A, which for purposes of illustration will be called the purge bed, a mixture of unadsorbed feed hydrocarbons and traces of incidentally desorbed adsorbate. This mixture is passed into the top of sieve Bed C which has just been desorbed in Cycle One. This bed top of sieve Bed C which has just been desorbed in Cycle One. This bed now functions as the guard bed, wherein the adsorbate coming from the purge bed is adsorbed from the mixture. From the bottom of the guard bed is withdrawn purge effluent which comprises denormalized hydrocarbons and eluent which are subsequently combined with and separated with the effluent from Bed B. Cycle Two continues until substantially all of the unadsorbed feed hydrocarbons are purged from the saturated purge bed, whereupon the hydrocarbon flow is switched to Cycle Three.

Cycle Three

Cycle Three comprises repeating the steps of Cycle One except that the sieve Beds A, B and C now have different functions. Sieve Bed B now becomes the primary adsorption bed, sieve Bed C becomes the secondary adsorption bed and sieve Bed A becomes the desorption bed. Again this process is continued until Bed B becomes substantially saturated with adsorbate and sieve Bed A is substantially free of adsorbate. At the end of this cycle, the hydrocarbon flow is switched to Cycle Four.

Cycle Four

Cycle Four consists of repeating the steps of Cycle Two again wherein sieve Bed C becomes the sole adsorption bed and sieve Bed B becomes the purge bed and sieve Bed A becomes the guard bed. It will be noted that Cycles Three and Four are repetitious of Cycles One and Two, with the exception that the function of the beds has moved one place.

Cycle Five

Cycle Five is again a repeat of Cycle One with the exception that sieve Bed C now becomes the primary adsorption bed, sieve Bed A becomes the secondary adsorption bed and sieve Bed B becomes the desorption bed. Cycle Five is continued until sieve Bed C is saturated with adsorbate and sieve Bed B has been substantially freed of the adsorbate by desorption with the eluent. The process then switches to Cycle Six.

Cycle Six

Cycle Six is again a repeat of Cycle Four or Cycle Two wherein sieve Bed A becomes the sole adsorption bed, sieve Bed C becomes the purge bed and sieve Bed B becomes the guard bed. Upon the completion of this cycle the sieve Beds A, B and C have been through a complete cyclic process wherein each bed has been adsorbed, purged and desorbed of adsorbate and the process is ready to begin again with Cycle One. Because of the nature of this process and the manner of switching steps, it has been termed "Merry-Go-Round" process.

The operation of the process as described herein provides for complete utilization of any molecular sieve bed regardless of size. It is therefore possible to obtain maximum efficiency through use of a minimum sieve inventory. Not only will the full use of a minimum sieve inventory lower molecular sieve costs but also the pressure drop across smaller sieve beds will be reduced therefore requiring less energy input.

The choice of adsorbent temperatures and pressures for this process is fairly critical. It is shown in U.S. Patent 3,309,415 that temperatures for adsorption and desorption of n-paraffins in the $C_{10-15}$ range must be at least 40–50° C. higher than the dew point of the hydrocarbon feed to obtain sufficiently rapid exchange adsorption. Normally, higher temperatures disfavor adsorption and, conversely, favor desorption because the equilibrium capacity of the molecular sieves is lowered for a given adsorbate partial pressure over the bed. Desorption rates are also increased by higher temperature because of higher diffusion rates.

Sieve bed temperatures are not rapidly changed in this vapor-phase process and the operation is, therefore, essentially isothermal, i.e., adsorption and desorption occurring at substantially the same temperatures. Maximum bed temperatures, therefore, become limited by the rate of cracking of a hydrocarbon feed in the bed.

Further, the sieve bed temperature will approximate the feed and eluent temperatures since the effects of heat of adsorption and desorption are negligible. In both the adsorption and desorption steps, n-paraffins are adsorbed and desorbed and thus the exothermic heat of adsorption is counteracted by the endothermic heat of desorption. The result is an insignificant effect on the sieve bed temperature.

Generally speaking, adsorption is favored by higher pressures. The opposite is true for desorption. In the process of the present invention, however, minimum pressure is desired during the adsorption step because higher pressures require higher temperatures to maintain diffusion rates necessary for adsorption exchange, and the higher temperatures lead to excessive cracking of the feed. Adsorption pressures are therefore the minimum required to provide the necessary pressure drop between the inlet and outlet of each sieve bed in order to obtain the flow of gases through each bed.

In the the desorption step of the present invention, pressure variations have little effect on the desorption rate. The adverse effect of pressure in desorbing the product of n-paraffins is counteracted by a beneficial effect on the adsorption of the eluent. In this case higher pressures actually improve the desorption rate because adsorption of the eluent is favored more than the desorption of the product n-paraffins is impeded.

The hydrocarbon mixtures which may be separated according to the process of this invention may vary over a wide carbon number range. In general, n-paraffins having from about 5–30 carbon atoms may be separated. However, in a preferred embodiment of the process, n-paraffins of from 11–15 carbon atoms are separated from hydrocarbon mixtures such as kerosene.

It is obvious that the specific pressures and temperatures used are dependent on the range of n-paraffins being adsorbed and desorbed. In general, temperatures of from about 200 to 800° F. and at a pressure of about 0 to 500 p.s.i.g. may be used. In the preferred embodiment wherein $C_{11}$–$C_{15}$ n-paraffins are being separated from a hydrocarbon mixture, temperatures are from 600 to 750° C. and pressures of from about 0 to 100 p.s.i.g. are preferred. The eluent used in the present invention can be any n-paraffin eluent having a boiling range sufficiently different from the paraffins being adsorbed to be separated by distillation or other conventional means. In the preferred process of the invention, the eluent is an n-paraffin having from 6 to 9 carbon atoms and is preferably n-octane.

Materials suitable as molecular sieves for the purposes of the instant invention include crystalline dehydrated zeolites, natural or synthetic, having a well defined physical structure. Chemically, these zeolites are hydrous alumino-silicates generally containing cations of one or more of sodium, potassium, strontium, calcium or barium, although zeolites containing hydrogen, ammonium or other metal cations are also known. These zeolites have a characteristic three-dimensional aluminosilicate anionic network, the cations neutralizing the anionic charge. Any solid selective adsorbent which selectively adsorbs straight-chain hydrocarbons to the substantial exclusion of non-straight-chain hydrocarbons can be used. Especially applicable are selective adsorbents comprising certain natural or synthetic zeolites ar aluminosilicates, such as a calcium alumino-silicate, which exhibits the property of a molecular sieve, that is, matter made up of porous crystals wherein the pores of the crystals are of molecular dimension and are of substantially uniform size.

A well known adsorbent of this type is Linde Type 5A Molecular Sieve which is a calcium alumino-silicate which has a pore diameter of approximately 5 angstrom units, and an individual pore volume sufficiently large to admit straight-chain hydrocarbons, such as the normal paraffins and the normal olefins, to the substantial exclusion of the non-straight-chain hydrocarbons, i.e., naphthenic, aromatic, isoparaffinic and iso-olefinic hydrocarbons. This particular selective adsorbent is available in various sizes, such as in the form of 1/8 inch or 1/16 inch diameter pellets, or as a finely divided powder having a particular size in the range of 0.5 to 5.0 microns. Materials of this type and methods of making such materials are described in U.S. 2,882,243 and U.S. 3,078,645.

Some of the naturally occurring zeolites which are suitable include chabazite, phacolite, gmelinite, harmotome, phillipsite, clinoptilolite and erionite in either natural or ion exchanged forms.

As stated previously, each bed throughout the operation of the complete process undergoes an adsorption step, a purge step and a desorption step and in addition may undergo a regeneration step wherein the capacity of the bed to adsorb n-paraffins is restored from time to time. Each of these steps will be described in detail with further reference to FIGURE 1.

In the process cycle the adsorption and desorption steps each involve a system in which the n-paraffins are adsorbed and desorbed in an attempt to establish equilibrium between the adsorbed phase and the atmosphere surrounding the sieve. Important in this function is the diffusion of the n-paraffins through (1) the void spaces external to the sieve, (2) the sieve pores and (3) the internal interconnecting channels within the sieves. Rates of diffusion play a critical role and for this reason substantially better adsorption and desorption rates can be obtained if conducted in the vapor phase than in the liquid phase.

Figure 1A:
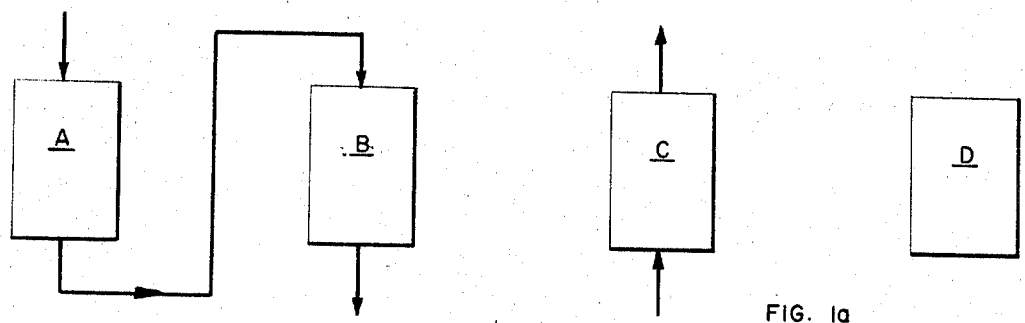
FIGURE 1 shows simplified flow diagrams of the first three cycles of the six cycles of the process of this invention.

With reference to FIGURE 1a, a vaporized feed flows into the top of the sieve Bed A and passes downwardly through the molecular sieves where the n-paraffins are adsorbed, displacing the eluent in the sieve cavities. As previously mentioned the front between the adsorbate eluent does not move uniformly throughout the bed, but may move at different rates at one side of the bed or the other. Therefore, in conventional processes the adsorption step must be discontinued before "break through" of feed n-paraffins into the effluent passing from the bottom of the bed.

In the process of the present invention, adsorption is continued even though a "break through" of feed paraffins from the bottom of the bed occurs. A means for detecting the amount of paraffins in the stream effluent from the bottom of the primary adsorption bed, such as a gas liquid chromatograph (GLC), is placed in a position to sample this effluent stream. The effluent from Bed A, which bed is referred to as a primary adsorption bed, consists of the non-normal hydrocarbons from the feed, eluent and "break through" feed paraffins. This effluent flows into the top of Bed B which functions as a secondary adsorption bed. As the stream passes through this bed, the residual feed normals are adsorbed on the sieve and eluent is displaced from the sieve cavities. When the means placed between the primary and secondary adsorption beds detects, from the content of feed paraffins in the stream, that adsorption is no longer occurring and that the primary adsorption bed has been saturated, this step of the cycle is completed and primary adsorption Bed A is now ready to begin the purge step.

While the process steps are being defined primarily in conjunction with Bed A, it should be mentioned that during the adsorption wherein Bed A serves as the primary adsorption bed and Bed B as the secondary adsorption bed, Bed C is being desorbed as illustrated in FIGURE 1a. The desorption process will be described in detail later.

Figure 1B:
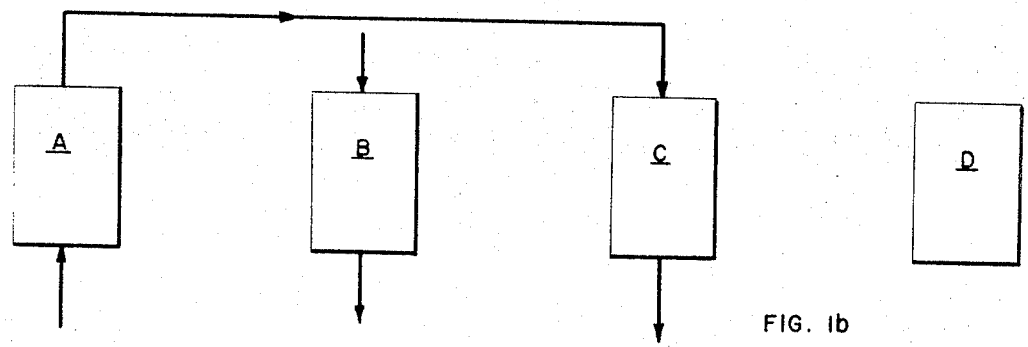

When the capacity of sieve Bed A to adsorb normal paraffins has been reached, the process flow lineup to the various beds changes as indicated in FIGURE 1b and the secondary adsorption bed becomes the primary adsorption bed with the effluent from this bed going directly to a separate process to remove the denormalized hydrocarbons from the eluent paraffin.

In the purge cycle represented by FIGURE 1b the eluent is routed through the bottom of Bed A, which has finished the adsorption cycle and is saturated with adsorbate, and passes upwardly through the bed purging non-normal hydrocarbons and any unadsorbed normals through the top of the bed. Minor amounts of adsorbate are also desorbed. This stream then passes into the top of sieve Bed C, which has recently been desorbed of adsorbate paraffins and passes downwardly through this sieve bed whereby feed and adsorbate paraffins removed in the purge of Bed A are adsorbed in Bed C. In the purge cycle, Bed C functions similarily to Bed B in the adsorption cycle in that both recover paraffins not adsorbed in a previous bed. They differ in that instead of the feed effluent from the adsorption step feeding into the next adsorption bed as in FIGURE 1a the effluent from the purge feeds into the adsorption bed as in FIGURE 1b. The effluent coming from the bottom of Bed C called "purge effluent" then passes outside the system to be separated into its components, namely, denormalized hydrocarbons and eluent. The purge step continues until substantially all of the non-adsorbed hydrocarbons are purged out of the bed, in this instance Bed A. At this point the process flow again switches and Bed A is now ready for desorption.

Figure 1C:
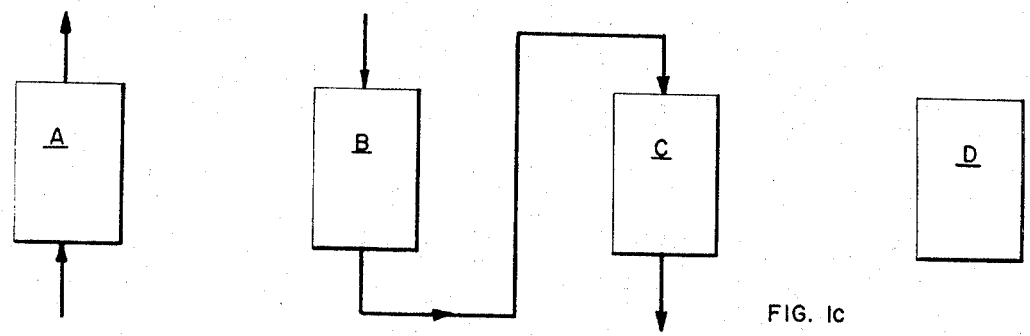

The desorption cycle is illustrated in FIGURE 1c wherein eluent is passed into the bottom of sieve Bed A, thereby desorbing the adsorbate from the bed. It is to be noted that both the purge and the desorption steps are accomplished by employing an eluent flow which is in a direction counter to that of the direction of the flow of feed during adsorption. This reverse flow direction of eluent (1) results in higher desorption rates and (2) prevents loss of n-paraffins during the following adsorption step.

The improved desorption rates are attributed to the greater affinity of sieves for the high molecular weight n-paraffins. At the end of an adsorption step, the bed is loaded with the highest molecular weight n-paraffin at feed inlet. The average molecular weight of adsorbed n-paraffins decreases with increasing distance from the inlet. By use of reverse flow the low molecular weight n-paraffins are desorbed first and subsequently aid the eluent in the desorption of high molecular weight n-paraffins. In contrast, with the co-current elution or desorption, the heavy n-paraffins would be readsorbed in passing down the bed and considerably more eluent would be required for desorption. Further, the removal of n-paraffins may or may not be entirely complete in the desorption step. If there are normals remaining they concentrate near the elution outlet of the bed being desorbed. With reverse flow desorption the remaining normals are at the top of the feed bed and are not desorbed in the following adsorption step. On the other hand with the co-current desorption the remaining normals are at the bottom of the bed and in the next adsorption period, wherein the freshly desorbed bed functions as a secondary adsorption bed, these remaining normals will be partly desorbed by the eluent in the denormalized feed stream, and thus are lost to this stream.

When the working capacity of a sieve bed drops below a desired level, or when the time of adsorption drops to a minimum, the molecular sieves must be regenerated. This regeneration step does not occur in each cycle, but takes place only periodically. For this reason it is advantageous to operate the process with four sieve beds. Sieve Bed D as shown in FIGURE 1 can be in the process of being regenerated when sieve Beds A, B and C are in the regular cycles of adsorption, purge and desorption. Obviously when the adsorption capacity of any sieve bed drops to the point where regeneration is necessary that sieve bed can be replaced with freshly regenerated sieve Bed D. In other words, while three sieve beds are on stream one may be on standby of regeneration.

While any method of regenerating the beds may be used, the following steps are preferred. The bed to be regenerated is first purged with natural gas at high temperatures to strip as much hydrocarbon material from the sieves as possible. The bed is then cooled to a lower temperature with natural gas after which nitrogen purge gas passes through the bed to remove the natural gas. When the natural gas has been removed a controlled burning of the carbanaceous material on the sieves takes place by injection of about 1% oxygen into the circulating nitrogen stream. When the burning front has passed through the bed, the bed is heated by circulating the nitrogen with 1% oxygen and is kept at an elevated temperature until oxygen consumption has ceased. The bed is subsequently cooled down to adsorption temperature and purged with nitrogen to remove the oxygen remaining in the bed.

In summarizing the above steps the adsorption-desorption system employed normally operates with three sieve beds, two in series on an adsorption cycle and the third on desorption. This lineup is shown in FIGURE 1a. Sieve Bed B functions as a secondary adsorption bed to adsorb any feed n-paraffins not adsorbed in Bed A. This allows Bed A to become completely loaded with adsorbed normal paraffins without sacrifiicing n-paraffin recovery.

When Bed A is saturated with adsorbate valves are switched to provide the lineup in FIGURE 1b. Feed goes directly to Bed B while Bed A is purged upwardly with eluent to remove non-adsorbed hydrocarbons from between the sieves. Since some feed normal paraffins are not adsorbed and a minor amount of desorption of normal paraffins also occurs during the purge step, effluent from Bed A is routed downwardly through the freshly eluted Bed C to readsorb these normal paraffins.

At the end of the purge period, valves are again switched to align the beds as shown in FIGURE 1c. This arrangement is equivalent in operation to the FIGURE 1a, except the functions of the bed have shifted one place. It is evident that upon completion of two more cycles as just described the beds would return to the position of FIGURE 1a.

One advantage of the present invention is that it may be used over a rather wide range of hydrocarbon materials. While it is preferred to recover a $C_{11}$-$C_{15}$ normal paraffin range, the process is also applicable to other types of feed. For example, the preferred eluent is n-octane for recovering the above-mentioned $C_{11}$-$C_{15}$ mixture. N-octane may be obtained for use as an eluent by passing an n-octane containing hydrocarbon mixture through the above-described process, using n-pentane as an eluent and recovering as product n-octane for use as an eluent in the preferred embodiment of the invention. It, of course, follows that feed rates, temperatures, pressures and other operating conditions will be adjusted according to the mixture being separated and the eluent being used.

It should be noted that for the purpose of this invention, the description of Beds A, B, C and D is in relative terms and each designation of A, B, C and D may actually encompass a plurality of beds. Moreover the terms "up" and "down" as used in this invention refer to the direction of flow of the gaseous substances through the sieve beds. Again these terms are relative and are used to indicate the passage of flow from an inlet of the bed to the outlet at the other end of the bed. The flow under certain circumstances may be reversed to a "down"-"up" position or if desired the beds may be in a horizontal position and the inlet to the bed during adsorption would be equivalent to that referred to as the "up" or "top" position of the present invention and the outlet of the horizontal bed would be considered the "down" or "bottom" position of the bed. What is essential to the operation of this invention is that the flow of hydrocarbons through the sieve beds during adsorption is in a direction opposite to the hydrocarbon flow during the purge and desorption steps.

The process will now be described in reference to the following example, which is illustrative only and is not to be construed as limiting the present invention.

EXAMPLE

Figure 2:
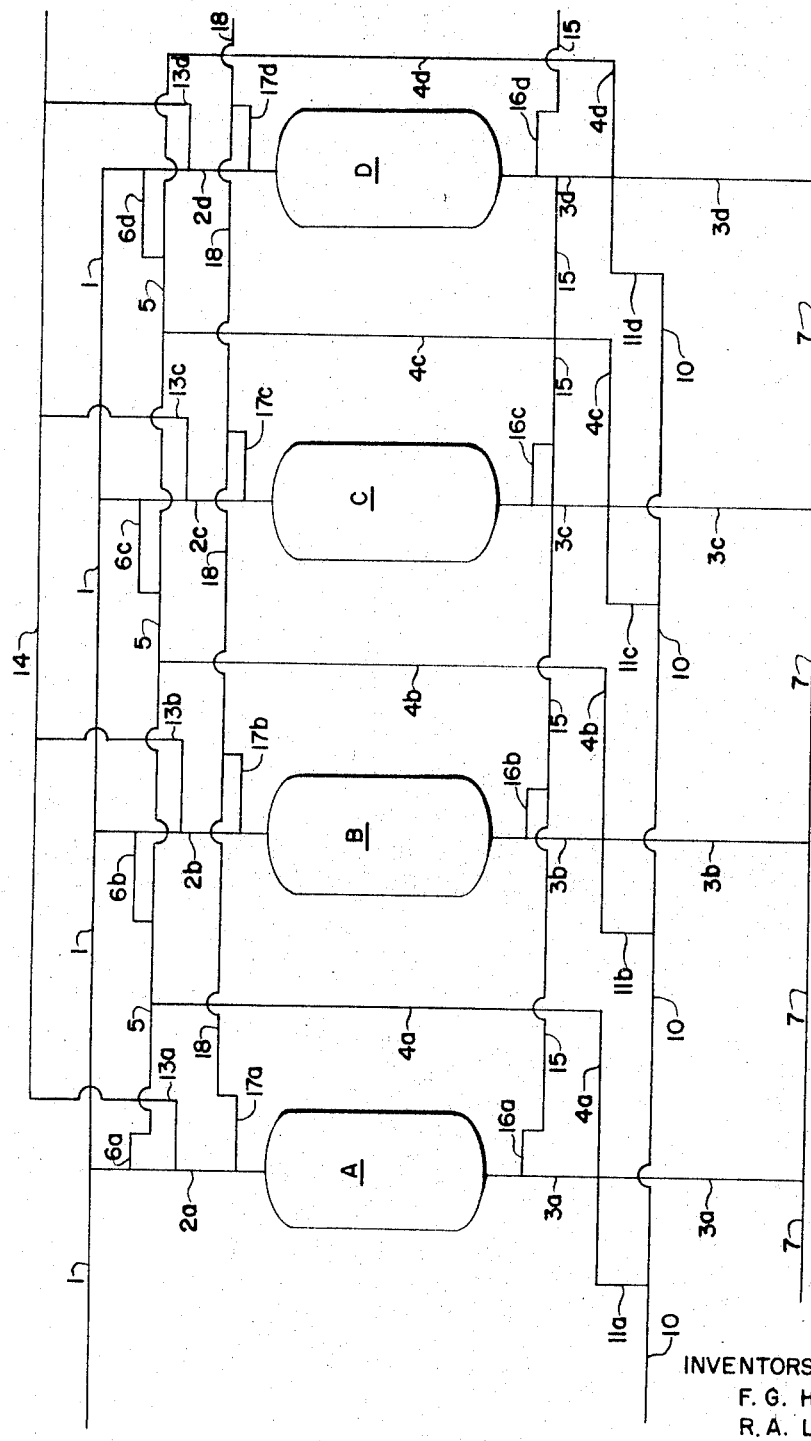
FIGURE 2 shows a more complete flow diagram of the operation of this process.

This example shows a typical operation using a kerosene feed stream and is described in reference to FIGURE 2. The apparatus employed in this process may be any conventional or convenient type known to those skilled in the art. For simplicity, FIGURE 2 does not show all the pumps, tanks, heat exchangers, valves, by-passes, vents, condensers, coolers and other auxiliaries that may be necessary for the proper operation of the process but the inclusion of which will be evident to those skilled in the art.

A vaporous $C_{11}$–$C_{14}$ kerosene feed fraction at a temperature of 660° F. and a pressure of 42 p.s.i.g. is fed at the rate of 10,679 bbls./hr. to the top of sieve Bed A by means of lines 1 and 2a. Sieve Bed A is filled with about 120,000 lbs. of a 5A molecular sieve maintained at 660° F. The vaporous feed flows downwardly through the sieves where the normal paraffins are adsorbed, displacing the eluent (n-octane in this case), remaining from a previous cycle, from the sieve cavities. The denormalized kerosene, plus the displaced eluent, leaves Bed A through the bottom via line 3a at a pressure of about 31 p.s.i.g. and passes through lines 4a, 5, 6b and 2b into sieve Bed B which functions as a secondary adsorption bed adsorbing any normals not adsorbed in Bed A. A GLC (not shown) is located at the head of Bed B to show when a large break through in normal paraffins from adsorption Bed A occurs. This aids in determining the length of time a given bed should be in adsorption service and allows the primary adsorption bed to become saturated. The denormalized paraffins and n-octane eluent pass downward through Bed B in the same manner as in Bed A and pass out the bottom of the bed via line 3b at a pressure of 20 p.s.i.g. and at a rate of 10,560 bbls./day into line 7 wherein this mixture passes into a separation zone (not shown) where the denormalized kerosene is separated from the n-octane eluent. The eluent may then be recycled to be reused in the process as described below.

When the capacity of Bed A to adsorb normal paraffins has been reached, the lineup flow to the various beds is changed. Bed B, formerly the secondary adsorption bed, now receives the feed from line 1 via line 2b and becomes the sole adsorption bed. Because its capacity to adsorb normal paraffins has only been partially utilized there is no immediate need for a secondary adsorption bed and the effluent from this bed passes directly, by means of line 3b into line 7 for eluent-denormalized kerosene separation. This procedure is maintained only during the purge of denormalized kerosene and unadsorbed paraffins from Bed A as follows. A purge gas from line 10, consisting of n-octane, is fed into the bottom of Bed A through lines 11a and 3a and moves upward through the bed. The denormalized kerosene and any unadsorbed normals are swept upward through the bed by the purge gas and pass out of the top through lines 2a, 6a, 5, 6c and 2c into the top of sieve Bed C wherein the normal paraffins from the feed are adsorbed and the denormalized kerosene and eluent n-octane passes downward through Bed C and passes out of the bed through line 3c into line 7 where this mixture joins with the denormalized kerosene and eluent mixture from line 3b for recovery and subsequent separation. The purge effluent leaves Bed C at the rate of 1,943 bbls./hr.

When the non-normals have been purged from the saturated sieve Bed A the adsorbed n-paraffins are recovered from the saturated bed by elution (desorption) with n-octane in the following manner. Eluent, at a temperature of 660° F. and at a pressure of 58.5 p.s.i.g. enters the bottom of Bed A as in the purge step and passes upward through the bed to desorb and dilute the adsorbed normal paraffins. The eluent-normal paraffin stream exits through the top of Bed A at the rate of 9,957 bbls./day through lines 2a, 13a and into line 14 from which the product is recovered and the eluent n-octane separated therefrom. The n-paraffins are recovered at the rate of 1,709 bbls./day and the separated n-octane eluent is recycled back into the system.

Periodically, when the working capacity of a sieve bed drops below a desired level, or when the time of adsorption drops to a minimum, the molecular sieves must be regenerated. Regeneration, involving one bed at a time, consists of passing the regenerating gas into the bed to be regenerated (assuming that to be Bed A for purposes of illustration) by means of lines 15 and 16a and upward through the bed. The regenerating gas and products removed exit Bed A through line 17a and pass out of the system via line 18. The regeneration may take place according to the following steps. The bed is purged with natural gas at 900–950° F. to strip as much hydrocarbon material from the sieves as possible. The bed is subsequently cooled to 700° F. with natural gas followed by a nitrogen purge and then a controlled burning of carbonaceous material on the sieves by injection of about 1% oxygen into the circulating nitrogen stream. The regeneration is concluded with a high temperature soak (950° F.) with 1% oxygen-nitrogen stream with a final nitrogen purge to remove the oxygen.

The process described above can be repeated in turn until each of sieve Beds A, B and C has been utilized in adsorption, purge and desorption steps whereupon the cycle may be started all over again. Sieve Bed D may be utilized in the process in the place of any other sieve bed while that bed is on reserve or is being regenerated.

We claim as our invention:

1. In a vapor-phase process for the separation of normal paraffins from a hydrocarbon feed mixture comprising normal feed paraffins and non-normal hydrocarbons by periodic contact of the feed with a molecular sieve to effect adsorption of the normal feed paraffins, followed by a purge of non-normal hydrocarbons and non-adsorbed normal feed paraffins from the sieve after which the adsorbed normal feed paraffins are desorbed from the sieve by contact with a normal paraffin eluent having at least two carbon atoms more or less than the adsorbed normal feed paraffins the improvement which comprises carrying out the process in a continuous, cyclic manner in sieve Beds A, B, and C by repeating in turn the steps of cycles one to six wherein the hydrocarbon flow proceeds as follows: Cycle One, which comprises:

(a) passing the hydrocarbon feed mixture into the top of sieve Bed A which functions as a primary adsorption bed thereby adsorbing normal feed paraffins from the feed mixture and desorbing eluent from the bed and withdrawing from the bottom of said primary adsorption bed an effluent comprising a substantially denormalized hydrocarbons and eluent; and (b) passing the effluent from step (a) into the top of sieve Bed B which functions as a secondary adsorption bed wherein residual normal feed paraffins in the effluent from Bed A are adsorbed and withdrawing from the bottom of the secondary adsorption bed an adsorption effluent comprising denormalized hydrocarbons and eluent which are subsequently separated; and (c) passing eluent into the bottom of sieve Bed C, saturated with normal paraffins from the feed mixture and which functions as a desorption bed, the eluent flowing upwardly through the bed thereby desorbing normal feed paraffins from the bed, and withdrawing from the top of the bed a desorption effluent comprising normal feed paraffins and eluent, which are subsequently separated; and (d) continuing steps (a), (b), and (c) until the primary adsorption bed becomes substantially saturated with normal feed paraffins and the desorption bed is substantially free of normal feed paraffins whereupon the hydrocarbon flow is switched to Cycle Two, which comprises:

(e) passing the hydrocarbon feed mixture into the top of sieve Bed B which now functions as a sole adsorption bed thereby adsorbing normal feed paraffins from the feed mixture and desorbing eluent, and withdrawing from the bottom of said sole adsorption bed an adsorption effluent which is subsequently separated as in step (b) above; and (f) passing eluent into the bottom of sieve Bed A, saturated with normal feed paraffins, which now function as a purge bed and passing said eluent upwardly through the bed thereby purging through the top of said purge bed a mixture of non-adsorbed feed hydrocarbons and some desorbed normal feed paraffins and passing said mixture into the top of freshly desorbed sieve Bed C which now functions as a guard bed wherein the normal feed paraffins are adsorbed from the mixture and withdrawing from the bottom of said guard bed a purge effluent comprising denormalized hydrocarbons and eluent which is subsequently separated as in step (b) above, (g) continuing steps (e) and (f) until substantially all of the non-adsorbed feed hydrocarbons are purged from said saturated purge bed whereupon the hydrocarbon flow is switched to Cycle Three, which comprises:

(h) repeating the steps of Cycle One wherein sieve Bed B becomes the primary adsorption bed, sieve Bed C becomes the secondary adsorption bed and sieve Bed A becomes the desorption bed, until Bed B becomes substantially saturated with normal feed paraffins and sieve Bed A is substantially free of normal feed paraffins whereupon the hydrocarbon flow is switched to Cycle Four, which comprises:

(i) repeating the steps of Cycle Two wherein sieve Bed C becomes the sole adsorption bed, sieve Bed B becomes the purge bed and sieve Bed A becomes the guard bed, until substantially all of the non-adsorbed feed hydrocarbons are purged from said saturated purge bed whereupon the hydrocarbon flow is switched to Cycle Five, which comprises:

(j) repeating the steps of Cycle One wherein sieve Bed C becomes the primary adsorption bed, sieve Bed A becomes the secondary adsorption bed and sieve Bed B becomes the desorption bed, until Bed C becomes substantially saturated with normal feed paraffins and sieve Bed B is substantially free of normal feed paraffins whereupon the hydrocarbon flow is switched to Cycle Six, which comprises:

(k) repeating the steps of Cycle Two wherein sieve Bed A becomes the sole adsorption bed, sieve Bed C becomes the purge bed and sieve Bed B becomes the guard bed, until substantially all of the non-adsorbed feed hydrocarbons are purged from said saturated purge bed whereupon the cyclic process, beginning with Cycle One, is repeated.

2. The process according to claim 1 wherein the various steps are carried out at a temperature of from about 200° F. to about 800° F. and at a pressure of from about 0 p.s.i.g. to about 500 p.s.i.g.

3. The process according to claim 2 wherein the molecular sieve is a crystalline dehydrated zeolite having an average pore diameter of about 5 angstroms.

4. The process according to claim 3 wherein the normal feed paraffins in the hydrocarbon feed mixture contain from about 11 to about 15 carbon atoms.

5. The process according to claim 3 wherein the process is carried out substantially isothermally.

6. The process according to claim 4 wherein the hydrocarbon feed mixture is a kerosene feed stream.

7. The process according to claim 4 wherein the eluent is n-octane.

References Cited

UNITED STATES PATENTS

| 3,310,486 | 3/1967 | Broughton et al. | 208—310 |
| 3,395,097 | 7/1968 | Senn | 208—310 |

HERBERT LEVINE, *Primary Examiner.*

U.S. Cl. X.R.

260—676